Oct. 25, 1966  C. P. DE BIASI  3,280,934
AUTO KINETIC WHEEL OR FLUID MOTOR
Filed Sept. 21, 1964  5 Sheets-Sheet 1

INVENTOR
Charles P. de Biasi
ATTORNEY

Oct. 25, 1966   C. P. DE BIASI   3,280,934
AUTO KINETIC WHEEL OR FLUID MOTOR
Filed Sept. 21, 1964   5 Sheets-Sheet 2

INVENTOR
Charles P. de Biasi

Oct. 25, 1966    C. P. DE BIASI    3,280,934
AUTO KINETIC WHEEL OR FLUID MOTOR
Filed Sept. 21, 1964    5 Sheets-Sheet 3

INVENTOR
Charles P. de Biasi
BY
ATTORNEY

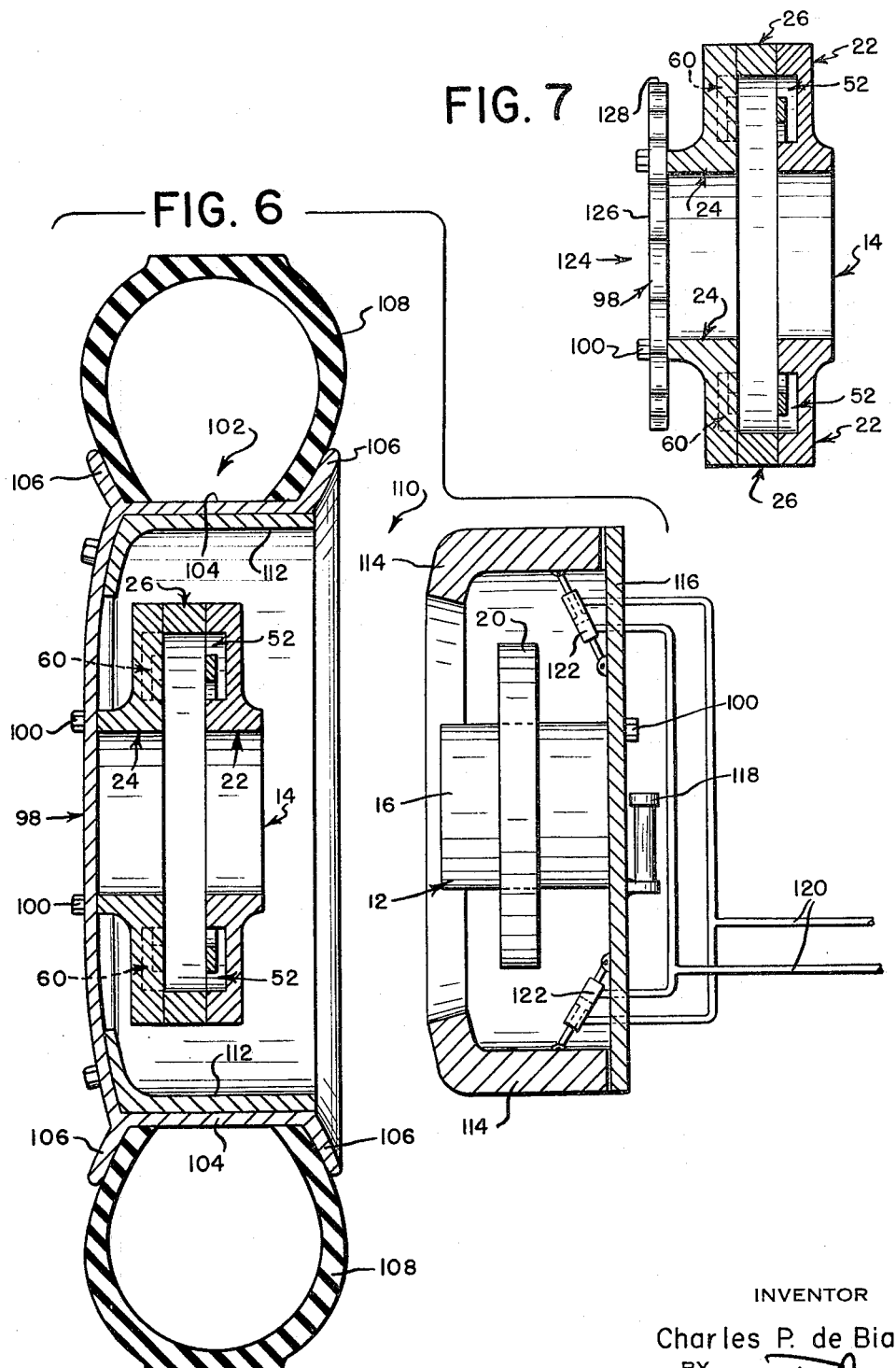

INVENTOR
Charles P. de Biasi

United States Patent Office 3,280,934
Patented Oct. 25, 1966

3,280,934
AUTO KINETIC WHEEL OR FLUID MOTOR
Charles P. de Biasi, 74 Braman Road,
Waterford, Conn.
Filed Sept. 21, 1964, Ser. No. 397,740
26 Claims. (Cl. 180—66)

This application is a continuation-in-part of application Serial Number 349,585, filed March 5, 1964, and entitled, "Fluid Motor."

The present invention relates, generally, to an auto kinetic wheel or fluid motor that is particularly adapted to supply torque to a driving wheel, such as a pneumatic tire, a driving sprocket, an endless track, a rim particularly adapted for use upon a rail, and the like, and even a combination thereof.

More particularly, this invention relates to a fluid motor comprising a stationary portion and a rotatably movable portion, said motor being so constructed and arranged as to form a component part of a driving wheel that is particularly adapted to have any one of a number of diverse types of wheel elements structurally operatively associated therewith, such as a pneumatic tire, a driving sprocket, an endless track, a rim particularly adapted for use upon rails, and the like, and even a combination thereof.

Still another primary object of the present invention is to provide a reversible motor particularly adapted to handle fluids comprising a stationary portion and a rotatably movable portion, said motor being so constructed and arranged as to enable the supply and exhaust of a fluid thereto and therefrom through the medium of said stationary portion, eliminating the need for one or more direct connections to the rotatably movable portions, said motor being further so constructed and arranged as to form a component part of a driving wheel that is particularly adapted to have structurally operatively associated therewith, in any suitable manner, and with extreme and unusual facility, any one of a plurality of diverse types of wheel elements.

A further primary object of this invention is to provide a reversible fluid motor comprising a stationary portion and a rotatably movable portion, one of such stationary and movable portions having fluid pressure chambers, and the other of said portions having radially reciprocally movable vanes particularly adapted to reciprocally move in a generally radial direction into and out of said chambers, said motor being so constructed and arranged as to enable the supply and exhaust of pressure fluid thereto and therefrom through the medium of said stationary portion, eliminating the need for one or more direct connections to the rotatably movable portion, and to enable directing substantially all of the pressure fluid from the supply to the area or vicinity of said pressure chambers, substantially eliminating loss or wastage of said pressure fluid, and a resulting decrease in efficiency, and particularly in torque output, while yet further enabling a certain portion of said pressure fluid to be directed to locations requiring lubrication.

In addition, it is a primary object of this invention to provide a fluid motor for supplying torque to a driving wheel, said motor being so constructed and arranged as to form a component part of said wheel which is particularly adapted to have structurally operatively associated therewith any one of a number of diverse types of wheel elements, such as a pneumatic tire, a driving sprocket, an endless track, a rim particularly adapted for use upon a rail, and the like, and even a combination thereof, said fluid motor further being so constructed and arranged as to enable said driving wheel to be structurally operatively associated with or mounted upon a vehicle, in any suitable manner, and with extreme and unusual facility, as by means of cap screws, bolts, and the like, said motor being further so constructed and arranged as to present a simple construction, a minimum of moving parts, minimal contact between relatively movable parts, and being capable of assembly and disassembly with extreme facility.

Other objects and important features of the invention will be apparent from a study of the specification following taken with the drawing, which together show, illustrate, describe and disclose a preferred embodiment or modification of the invention and what is now considered to be the best mode of practicing the principles thereof. Other embodiments or modifications may be suggested to those having the benefit of the teachings herein, and such other embodiments or modifications are intended to be reserved especially as they fall within the scope and spirit of the subjoined claims.

In the drawings:

FIGURE 6 is a cross-sectional view illustrating one embodiment of a driving wheel having a fluid motor constructed in accordance with the present invention structurally operatively associated therewith;

FIGURE 7 is a cross-sectional view of another embodiment of a driving wheel, having a fluid motor constructed in accordance with the principles of the present invention structurally operatively associated therewith;

Figure 1:
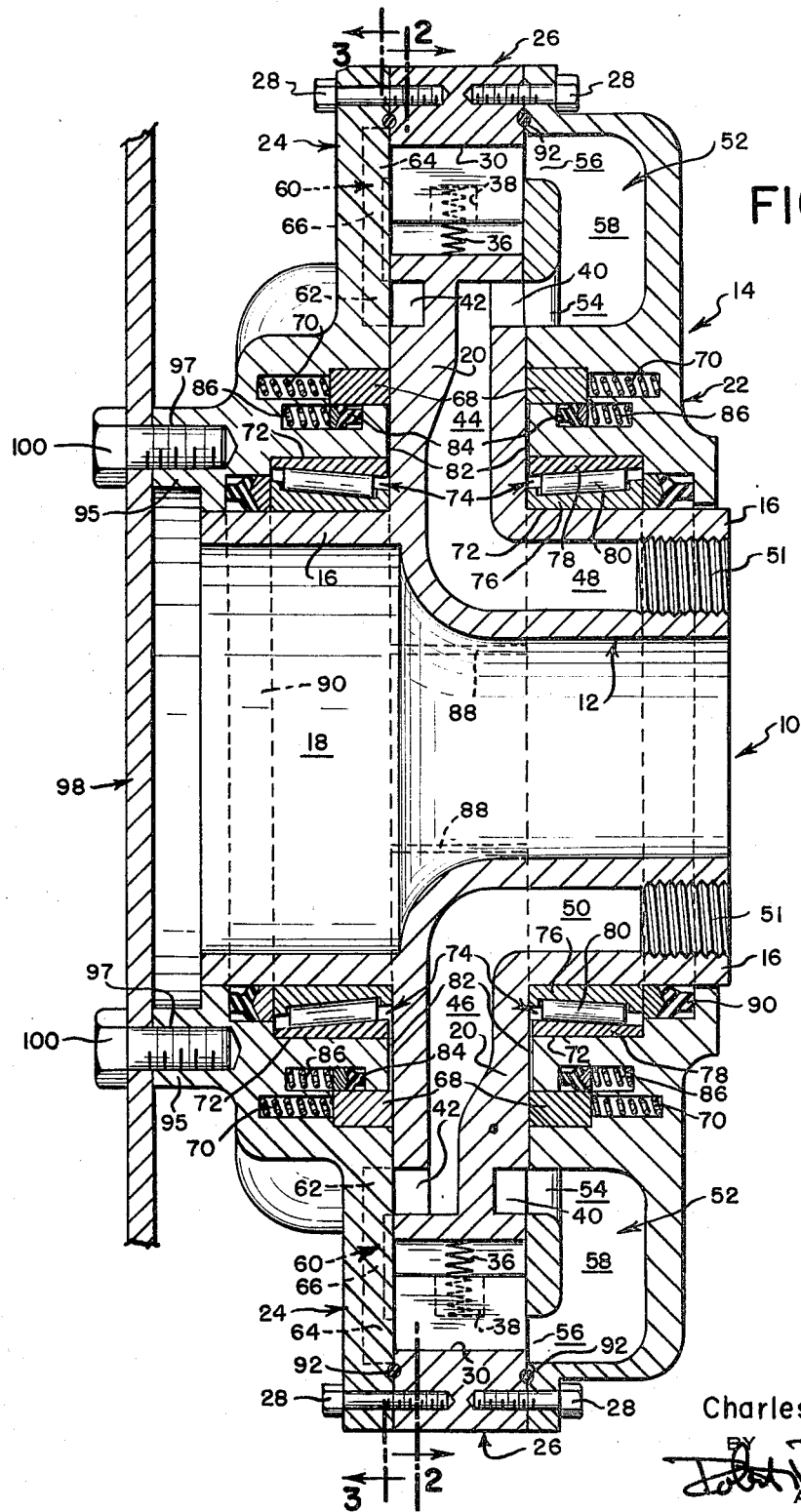
FIGURE 1 is a cross-sectional view of a fluid motor constructed in accordance with the present invention.
Figure 2:
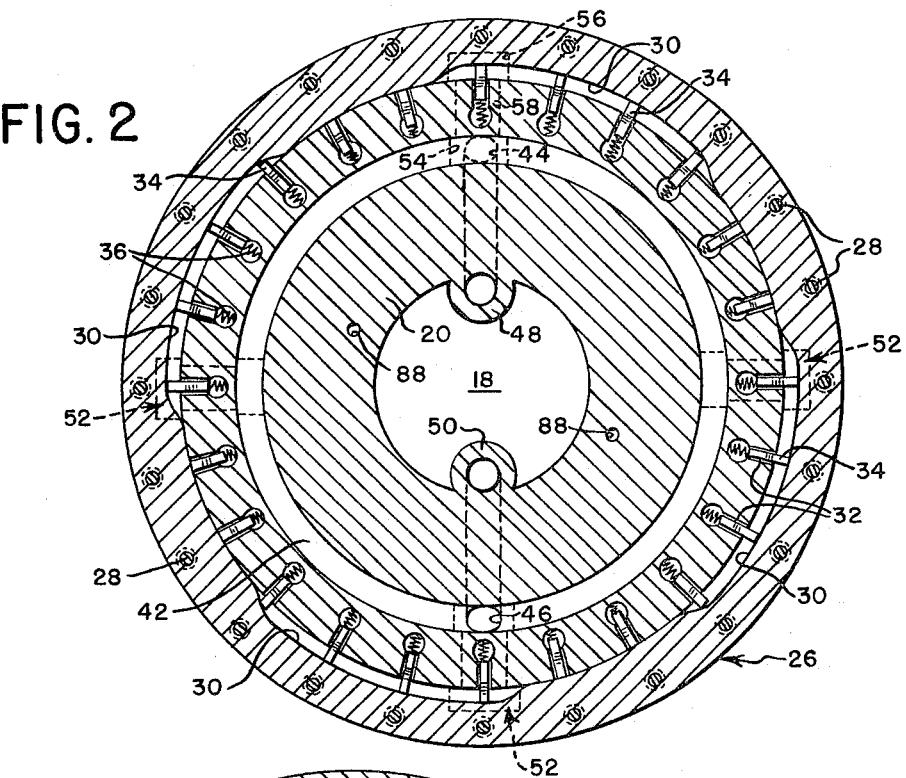
FIGURE 2 is a cross-sectional view taken along the line 2—2 of FIGURE 1.
Figure 3:
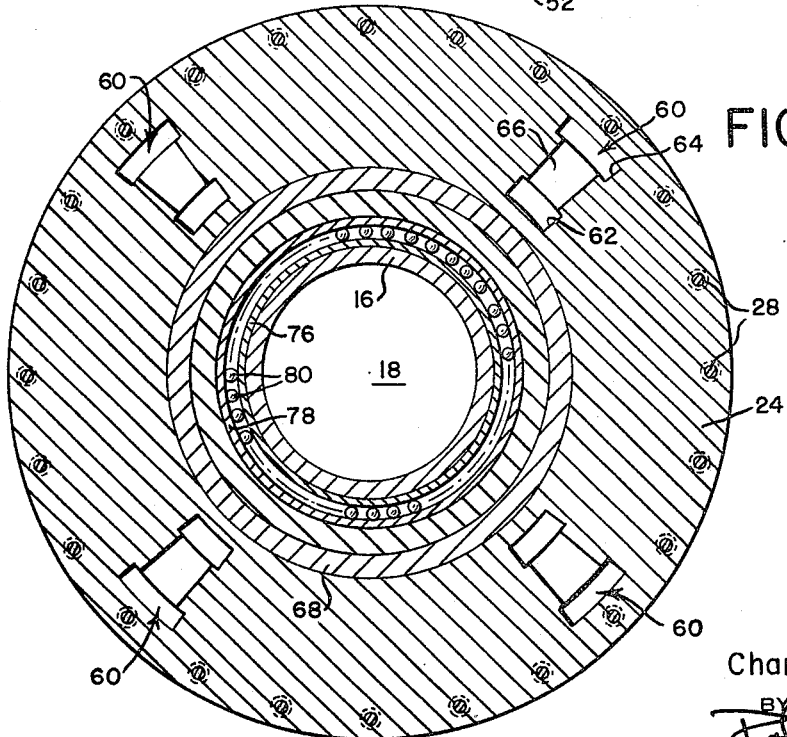
FIGURE 3 is a cross-sectional view taken along the line 3—3 of FIGURE 1.

With reference now to the drawings, and particularly FIGURES 1, 2, 3, there is illustrated therein a fluid motor or motorized wheel 10, constructed in accordance with the principles of the present invention, comprising a fixed or stationary generally cylindrical shaft member 12, and a generally cylindrical housing member 14 rotatably mounted upon and about the shaft member.

The shaft member comprises a generally cylindrical base portion 16 having a generally centrally disposed axial opening or bore 18 extending therethrough, and a radial flange portion 20 extending radially outwardly from the base portion 16 generally intermediate the ends thereof. The base portion 16 is particularly adapted to be fixedly structurally operatively associated with any suitable fixed support of a vehicle (not shown). This may be accomplished in any suitable manner, and, for example, the portion 16 may be provided with threaded bores (not shown) with which any suitable fastener (also not shown), such as cap screws, bolts, and the like, are particularly adapted to be threadably mutually cooperatively engageable.

The housing member 14 comprises a first completely annular section or plate 22 which is rotatably mounted upon the base portion 16 of the shaft member 12 adjacent one side or surface, namely, an input side or surface, of the flange portion 20, thereof, and a second annular section or plate 24, which is rotatably mounted on the base portion 16 adjacent the opposite side or surface, namely, an output side or surface, of the flange portion. An annular ring or cam ring 26 is disposed or positioned radially outwardly of and in rotatably slidable engagement with the exterior or peripheral surface of the flange portion 20, and is secured to the first and second annular housing plates 22 and 24 in any suitable manner, as through the medium of suitable fasteners 28. The ring or cam ring 26 is provided on its interior surface with a plurality of substantially equi-spaced generally arcuately or circumferentially extending chambers or recesses 30 therein for a purpose to be more fully described hereinafter. While four recesses 30 are illustrated by way of example, it will be understood that the number or quantity thereof may be varied, depending upon desired characteristics of the motor, such as torque output, rotational velocity, and the like. At least one other example will be described hereinafter.

With particular reference now to FIGURES 2 and 3, the flange portion 20 of the shaft member 12 is provided with a plurality of radially outwardly extending slots or grooves 32 equally spaced about the periphery thereof. A vane member 34 is particularly adapted to be radially reciprocally or slidably mounted in each of the grooves 32, and is urged or biased outwardly into mutual cooperative engagement with the interior surface of the ring or cam ring 26 by a coil spring 36 disposed or positioned within each of the grooves 32, and extending into a hollow portion 38 of the adjacent vane 34. The vane members 34 and springs 36 may be fabricated of any suitable material, and may be of any suitable construction. In addition, the number or quantity of vane members 34 and corresponding grooves 32 may be varied, as may the number of chambers 30, depending upon the aforesaid desired characteristics of the motor 10. For exemplary purposes only, therefore, there are illustrated 24 vanes 34, four of such vanes being particularly adapted to extend to within a corresponding one of the chambers 30 at any one time. Another example, as hereinbefore pointed out, will be discussed hereafter.

The flange portion 20 is provided with a first completely annular groove 40 in the aforesaid one side or input surface facing the first annular housing plate 22, and a second completely annular groove 42 in the opposite side or output surface thereof facing the second annular housing plate 24. The shaft member 12 is provided with radially extending bores 44 and 46 having the radially outer ends thereof in communication with the annular grooves 40 and 42. The shaft member 12 is particularly adapted to be integrally formed with fluid conduits 48 and 50, the inner ends of which are particularly adapted to connect with and correspond with the radially inner ends of the bores 44 and 46, enabling the presentation of a shaft member comprising a flange portion, namely, the portion 20, that is so constructed and arranged as to present integrally fabricated fluid conduits, such as the conduits 48 and 50, and bores, such as the bores 44 and 46, thus eliminating the need for any number of separate, individual, independent and distinct connections. Each of the conduits 48 and 50 is provided with interiorly threaded portions 51 for connection through suitable fluid lines (not shown). The fluid conduits 48 and 50 are particularly adapted to be utilized both to convey fluid under pressure from a suitable supply source, such as a pump (not shown) and reservoir (also not shown), to the shaft member 12, and to convey or exhaust fluid from the shaft member bores 44 and 46 to the reservoir (not shown) in a manner to be described more fully hereinafter.

With continued reference now to FIGURES 1 through 3, the first annular plate 22 of the housing member 14 has formed therein a plurality of radially extending channels 52 of generally U-shaped configuration having the radially inner end thereof in communication with the annular groove 40 in the shaft member flange portion 20. While any number of the channels 52 may be provided, four such equi-spaced channels are presented corresponding to the number of chambers 30. As pointed out above, the radial inner end of each channel, as defined by a leg 54 thereof, is disposed in communication with the annular groove 40. The radial outer end of each channel, as defined by a leg 56, is disposed in communication with each of the chambers 30. With particular reference now to FIGURE 2, it will be seen that each of the legs 54 and 56 is, in cross-section (as viewed in FIGURE 2), of generally arcuate rectangular configuration in a direction extending generally transversely of the plate 22, with the leg 56 being of somewhat greater transverse dimensional extent than the leg 54. The bight 58 of each channel 52 extends between each of the legs 54 and 56, and is of less transverse dimensional extent than each of them. It may now be said that each leg 54 or 56 defines an opening or aperture, one providing communication with the groove 40, and the other providing communication with the chamber 30. The bight 58 defines a fluid passage providing communication with and between the apertures or legs 54 and 56.

Similarly, the second annular plate 24 of the housing member 14 has formed therein a plurality of radially extending channels 60 having the inner ends thereof in communication with the groove 42. To this end, the plates 22 and 24 may be fabricated substantially identical with one another. When the plates are operatively associated with the ring 26, to form or define the housing 14, they are disposed in rotatively spaced relationship with respect to one another, enabling the channels 52 and 60 to be located, disposed, or positioned in 45 degree rotatively spaced relationship with respect to one another, as particularly illustrated in FIGURES 2 and 3. Accordingly, and as will be described more fully hereinafter, the leg 56 of each of the channels 52 is disposed in communication only with one end of the corresponding one of each of the chambers 30, while one leg of each of the channels 60, to be described hereinafter, communicates only with an opposite end of the said corresponding one of the channels. It will now be understood that the plate 24 would be illustrated in FIGURE 1 substantially identical to the plate 22, if the former was rotatably moved through an angle of 45 degrees in a clockwise direction, as viewed towards the right in that figure. Accordingly, and to facilitate an understanding of the present invention, a portion of the plate 24 is rotated in the aforesaid manner to enable a plurality of the channels 60 to appear in dotted lines. It is again emphasized, however, that these channels are disposed in 45-degree rotatably spaced or phased relationship with respect to the channels 52. This particular angular relationship will vary in accordance with the number of chambers 30, it being this particular value when four such chambers are presented, as illustrated.

As pointed out above, the plates 22 and 24 are substantially identical. Accordingly, the channels 60 may be of substantially the same configuration as the channels 52, notwithstanding the manner in which they are illustrated in FIGURE 1, which is to facilitate an understanding of the present invention, as also pointed out above, and, therefore, are of generally U-shaped configuration equi-spaced about the plate 24, with four such channels being provided in the illustrated example. The channels 60 comprise a plurality of legs 62 and 64 which, in cross-section (as viewed in FIGURE 3), are of generally arcuate rectangular configuration in a direction generally transversely of the plate, with the leg 64, which defines an aperture providing communication with the chambers 30, being of somewhat greater transverse dimensional extent than the leg 62, which defines an aperture in communication with the groove 42. The bight 66 of the channels 60, like the bight 58, defines a fluid passage providing communication with and between the apertures 62 and 64. It will now be understood that the channels 52 and 60 are substantially similar, the particular manner in which the channels 60 are illustrated being for purposes of facilitating an understanding of the invention, as pointed out above.

As seen in FIGURE 2, the arcuate apertures 56 in the housing plate 22 are located, disposed or positioned adjacent corresponding ends of the chambers 30 in the ring or cam 26, and the arcuate apertures 64 in the housing plate 24 are disposed adjacent the opposite corresponding ends of the cam ring chambers 30.

Thus, it will be readily seen that, since the plates 22 and 24 are structurally operatively associated with the ring 26, and are, therefore, particularly adapted to be rotatedly moved therewith, the arcuate apertures 56 and 64 are particularly adapted to be disposed in constant communication with the ends of the ring chambers 30, and may, therefore, be utilized to supply fluid to or to drain or exhaust fluid therefrom.

It will now be understood that fluid is particularly adapted to be supplied to the chambers 30 through the medium of one or the other of the fluid conduits 48 and 50 and their respective channels 52 and 60, and exhausted from the chambers by the other one of the conduits. If the fluid pressure is supplied through the medium of the conduit 48, it must first enter the groove 40 before being communicated to the channel 52. And, if fluid is supplied through the conduit 50, it must first enter the groove 42 before being communicated to the channel 60. The reverse is also true, namely, exhausted fluid must first be communicated to one or the other of the grooves 40 and 42 before being communicated to conduits 48 and 50 through the medium of the bores 44 and 46, respectively.

The grooves 40 and 42 are located in a corresponding one of each face of the flange portion 20 of the shaft member 12, immediately adjacent the inner faces of the plate members 22 and 24. In accordance with the hereinbefore set forth construction, it will be understood that the plate members are rotatably movable relative to the shaft member 12, and, thus, the flange portion 20 thereof. Accordingly, it is desirable that leakage between these relatively movable members be substantially completely precluded, particularly since a further criterion is that substantially all of the pressure fluid be directed into the chambers 30 on the supply side, enabling the presentation of a fluid motor, such as the motor 10, operable with maximum efficiency and substantially non-existent loss, leakage and wastage of fluid pressure.

To this end, each of the cylindrical plate members 22 and 24 is provided with completely annular seal rings 68, which may be fabricated of any suitable material, such as metal, and may be of any suitable construction. These seal rings are positioned or located in the interior faces of the plates 22 and 24, enabling them to be disposed in sealing mutual cooperative engagement with the oppositely disposed exterior faces of the flange portion 20 of the shaft member 12. To insure that the sealing rings are maintained in this relationship with the flange portion, biasing means, such as coil springs 70, are particularly adapted to be positioned axially outwardly of and behind the rings to urge them in a direction towards the portion 20. In addition, the rings 68 are particularly adapted to be positioned or located radially inwardly of and substantially adjacent to the grooves 40 and 42, to preclude leakage in a direction generally radially inwardly thereof. Any leakage in a direction generally outwardly of the grooves 40 and 42 will tend to enter the slots 32, and eventually find its way into chambers 30, though such leakage is substantially precluded, as will be discussed hereinafter. Accordingly, it can be seen that the need for manufacturing the various component parts of the fluid motor 10, as hereinbefore described, at very close manufacturing tolerances has been substantially decreased. In fact, only the surfaces that affect the efficiency of the motor 10 must be accurately machined or finished to close tolerances. Thus, the exterior surfaces of the flange portion 20, and the interior surfaces of the plates 22 and 24, and the ring 26, must be accurately finished since they are disposed or positioned in contact with one another. This of course is particularly true of the peripheral surface of the flange portion 20, and the interior surface of the ring 26, since these surfaces operatively coact with the vanes 34. It can be said, therefore, that substantially all of the surfaces located radially outwardly of the rings 68 must be accurately machined. Accordingly, leakage between the channels 52, and between the channels 60, will be precluded, enabling fluid under pressure to be confined to the channels, so that it will be conveyed only into the chambers 30 and only at the proper side of the vanes 34. In this manner, and as pointed out above, maximum efficiency of the motor is achieved.

As hereinbefore pointed out, the housing member 14 is rotatably structurally operatively associated with, upon and about the shaft member 12. Accordingly, each of the plates 22 and 24 is provided with annular bearing housings 72 within which anti-friction bearings 74 are particularly adapted to be disposed, the bearings 74 being particularly adapted to carry or bear the friction introduced by and between the relatively movable members 12 and 14. The bearings 74 may be of any suitable construction, and, in the exemplary form illustrated, the use of a tapered roller bearing comprising inner and outer races 76 and 78, and generally cylindrical rollers 80 disposed therebetween is invoked. It is, of course, both necessary and desirable that the bearings 74 be lubricated. This is accomplished with facility through the medium of the seal ring 68. Thus, assuming that fluid pressure is supplied to the chambers 30 through the conduit 48, such fluid pressure will enter the annular groove 40 through the radially extending bore 44. Fluid under pressure in this groove will, in addition to flowing through the channels 52, tend to flow between the plate 22 and the input face or surface of the flange portion 20 of the shaft member 12. The seal ring will tend to preclude leakage therepast, but, under the influence of the spring 70, and by choosing the ring accordingly, will enable a minimal portion of fluid pressure to flow therepast. Hereinbefore, it was pointed out that manufacturing tolerances need not be close. In fact, at the location radially inwardly of the rings 68, the plates 22 and 24 can be so configured and arranged as to present a gap 82. This gap will provide communication between the location of the seal rings 68 and the bearings 74. Returning now to the high pressure side of the flange portion 20, any fluid pressure that flows past the seal ring 68 into the gap 82 adjacent the input side or surface of the flange portion, will, therefore, flow towards the bearing housing 72 in the plate 22 to lubricate the bearing 74. It is considered readily apparent that this same sequence of flow will take place if, instead of supplying fluid through the medium of the conduits 48, fluid pressure is supplied through the medium of the conduit 50.

In the above example, it was assumed that fluid pressure is supplied to the chambers 30 through the medium of the conduit 48, and exhausted therefrom by means of the conduit 50. It was further pointed out that, while the seal rings 68 substantially completely preclude leakage therepast, some leakage takes place to lubricate the bearings 74. It is desirable that all of this leakage or lubricating fluid be directed to the bearings 74, as opposed to enabling this fluid to leak past the inner radial surface of the seal ring 68 to the location of the spring 70. To this end, each of the plates 22 and 24 is provided with annular oil ring seals 84 disposed, positioned or located radially inwardly of but substantially immediately adjacent the seal rings 68. Each of these rings may be fabricated of any suitable material, may be of any suitable construction, and preferably is maintained in the illustrated position, enabling it to efficiently perform its function, in any suitable manner, as, for example, by means of a coil spring 86. In accordance with this construction the seal rings 84 define, in effect, single acting or one-way check valves, enabling flow to take place therepast in one direction only. Accordingly, should the pressure of lubricating fluid in the area of the gap 82 be greater than exhaust pressure along the exhaust side of the motor, the fluid will be directed to that side of the motor, and thence to that one of the conduits 48 and 50 connected to the aforesaid reservoir (not shown). The manner in which this flow takes place will presently be described. There is no need to position or locate a ring similar to the sealing ring 84 radially outwardly of the seal rings 68, since any leakage that tends to take place therealong will be directed towards the location of the spring 70, enabling a smooth and positive action thereof, and, in addition, will assist the spring in maintaining the seal rings 68 in a sealing mutual cooperative engagement with the flange portion 20. The volume of the location at which this spring is disposed will determine the amount of this leakage, and any additional leakage that tends to take place will be directed past the seal ring 68 towards the area of the gap 82.

Continuing to assume that the conduit 48 is the fluid pressure supply, and the conduit 50 is the return or exhaust line, it will be understood that only the bearing on the high pressure side of the motor 10, namely, the bearing 74 in the plate 22, will receive lubricating fluid through the gap 82, since only the fluid pressure in the groove 40 will be under sufficient fluid pressure to pass the seal ring 68 adjacent thereto in a radially inwardly disposed direction. It is, of course, desirable to lubricate the other bearing 74, and to this end, the shaft member 12 is provided with a plurality of fluid ports 88 extending between the bearing housings 72. Accordingly, fluid pressure entering the aperture 54 from the groove 40 will tend to flow between the plate 22 and the flange portion 20. This fluid will flow along the radially outer surface of the ring 68 into the area or location at which the spring 70 is disposed. At this point, the seal ring 84 in the plate 22 will function as a one-way check valve to preclude flow towards the gap 82. Therefore, a certain portion of the fluid pressure will flow past the ring 68, into the gap 82, and thence to the bearing 74 in the plate 22. As long as the pressure of this fluid is greater than return or exhaust pressure, as reflected through the conduit 50, which is connected to the aforesaid reservoir (not shown), then it will be conveyed to the bearing 74 in the plate 24 through the medium of the fluid port 88. Fluid pressure thence will flow through the gap 82 in that plate, past the ring 84, since it acts as a one-way check valve, as hereinbefore pointed out, through the location of the spring 70, and thence along the radial outer surface of the ring 68, to the groove 42, and to exhaust conduit 50, in this example. Some pressure fluid may flow past the ring 68 along the flange portion 20. It will therefore be understood that a fluid motor constructed in accordance with the present invention such as the motor 10, is so construction and arranged as to make use of substantially all of the supplied fluid pressure, resulting in maximum efficiency, even though close manufacturing tolerances are not required, and yet is self-lubricating, both with respect to the pressure and exhaust sides of the motor. In addition, the aforesaid construction presents an internally case drained system, enabling fluid pressures to be returned to exhaust. And, since the fluid motor 10 is internally case drained, the need for separate, independent and external conduits from the motor to exhaust is eliminated. Moreover, it will be understood that high pressure fluid is sealed by the sealing rings 84, which are not in contact with moving parts, thus increasing the effective life thereof, resulting in only a low pressure acting on those seals that are in contact with moving parts, such as seal rings 90, presently to be described, thus increasing their effective life. Still further, and as hereinbefore pointed out, the percentage of area of the motor that must be accurately machined or finished is reduced.

It will now be understood that the above is equally true if the fluid conduit 50 were the supply conduit, and the conduit 48 the return conduit, the flow accordingly being reversed.

A seal ring 90 is positioned axially outwardly of each of the bearing housings 72 to preclude the leakage of lubricating fluid outwardly of and from the bearings 74. The rings 90 may be of any suitable construction, and may be fabricated of any suitable material, keeping in mind only that they are subject to wear since they are disposed between relatively movable parts, namely, the base portion 16 of the shaft member 12, and the plates 22 and 24 of the housing member 14. These sealing rings are particularly adapted to preclude leakage outwardly of the bearings 74, as hereinbefore pointed out, and since they are never subject to high pressures (only lubricating fluid pressures are present in the bearing housings 72), the possibility of leakage therepast is minimal. At this point, it is again noted that the fluid ports 88 preclude the building up of excessive lubricating pressures. O course, it is the sealing rings 68 and 84 that initially preclude excessive pressures from entering the bearing housings, these rings enabling only sufficient fluid pressure to perform a lubricating function to leak therepast.

In the operation of the fluid motor 10, and when fluid under pressure is supplied to the integral conduit 48, for example, by a pump or pumps (not shown), the fluid flows into the shaft member radial bore 44, and thence into the annular flange groove 40. The fluid then passes into each of the channels 58, through the medium of the apertures or legs 54 in the first annular housing plate 22 and flows radially outwardly into the arcuate apertures 56 therein. Since the arcuate plate apertures 56 are in constant communication with corresponding ends of the ring or cam ring chambers 30, the fluid passes into these chambers, and is trapped between the end thereof and the adjacent vane member 34. The fluid under pressure thus exerts a force against the portions of the ring 26 defining the end of each chamber 30 adjacent the arcuate apertures 56 and against the adjacent vane member 34 in each chamber. Since the vane members 34 are mounted only for radial movement on the stationary shaft member 12 and thus cannot move in a circumferential direction, the fluid under pressure in each chamber 30 causes the cam ring 26 to rotate about the shaft member 12 in a generally counterclockwise direction as shown in FIG. 2. Since the housing plates 22 and 24 are secured to the ring 26 they rotate therewith about the base portion 16 of the shaft member 12. As the leading end of each chamber 30 passes a vane member 34, therefore, a force is applied to the cam ring 26 by the fluid pressure between the vane member 34 and the leading chamber end, thereby resulting in a smooth, positive and continuous rotation of the housing member 14 about the shaft member 12.

In order to drain the fluid in the chambers 30 from the opposite corresponding ends thereof, the integral conduit 50 leads to the aforesaid fluid reservoir (not shown). The arcuate apertures 64 in the second housing plate 24 thus will constantly drain fluid from the trailing ends of the chambers 30, which fluid will flow radially inwardly through the radial fluid passages in the housing plate 24, into the annular groove 42 through the medium of the arcuate apertures 62, and thence through the radial shaft bore 46 into the drain conduit 50.

In order to insure against leakage of the pressure fluid outwardly of and from the fluid motor 10, a pair of O-rings 92 is provided between the annular housing plates 22 and 24 and the ring or cam ring 26 of the housing member 14. It is noted, however, that any other suitable or conventional type of sealing means could be utilized.

In order to reverse the direction of the instant motor 10, that is, rotate the housing member 14 in a clockwise direction as shown in FIG. 2, all that is required is to connect the conduit 50 to the source of fluid pressure or pump (not shown), and to connect the conduit 48 to the reservoir (also not shown). This will result in fluid being supplied through the arcuate apertures 64 in the housing plate 24 to the opposite end of the chambers 30 and being drained from the aforesaid end of the chambers by the arcuate openings 56 in the housing plate 22. This reversal of flow in the conduits 48 and 50 can easily be accomplished by connecting them to a conventional reversing valve or valves (not shown) which are operable to selectively connect the conduits to the fluid pressure source or to the reservoir. A suitable fluid control system for this purpose is, for example, disclosed in United States Patent Number 3,003,262.

It is obvious that any suitable or desired number of chambers 30 may be provided in the cam ring 26 without departing from the spirit and scope of the present invention, as hereinbefore pointed out. For example, there may be provided six such chambers, thus reducing the required number of vanes 34 to three being simultaneously disposed in any one chamber at any one time, and one vane being disposed therebetween. The motor 10 will, of course, still present a smooth, positive, continuous and controlled output. Also, any suitable means may be utilized to brake the motor 10 of this invention, including a self-braking system if the fluid circuit were a closed one.

It will now be understood that a fluid motor constructed in accordance with the principles of the present invention, such as the fluid motor 10, is so constructed and arranged as to supply a substantial tractive thrust or torque without necessitating the use of additional mechanism, such as gears, torque multipliers, and the like. In addition, such a fluid motor is further so constructed and arranged as to apply the aforesaid substantial tractive thrust or torque tangential to its periphery, and substantially completely thereabout, in a direction corresponding to the desired direction of rotatable movement. Furthermore, such a fluid motor is reversible, and is still further so constructed and arranged as to enable the supply and exhaust of pressure fluid thereto and therefrom through the medium of fluid pressure conduits integral with a stationary portion thereof, eliminating the need for one or more direct connections to a rotatably movable portion thereof. Still further, a fluid motor constructed in accordance with the principles of the present invention, such as the fluid motor 10, is so constructed and arranged as to direct substantially all of the pressure fluid from a supply to the area or vicinity of a plurality of pressure chambers, substantially eliminating loss or wastage of said pressure fluid, and a resulting decrease in efficiency, and particularly in torque output, said fluid motor being so constructed and arranged as to enable a certain portion of said pressure fluid to be directed to locations requiring lubrication, and further enabling said pressure fluid to satisfy all of the requirements of propulsion and lubrication without necessitating the use of independent sources of supply and lubrication.

Figures 4, 5:
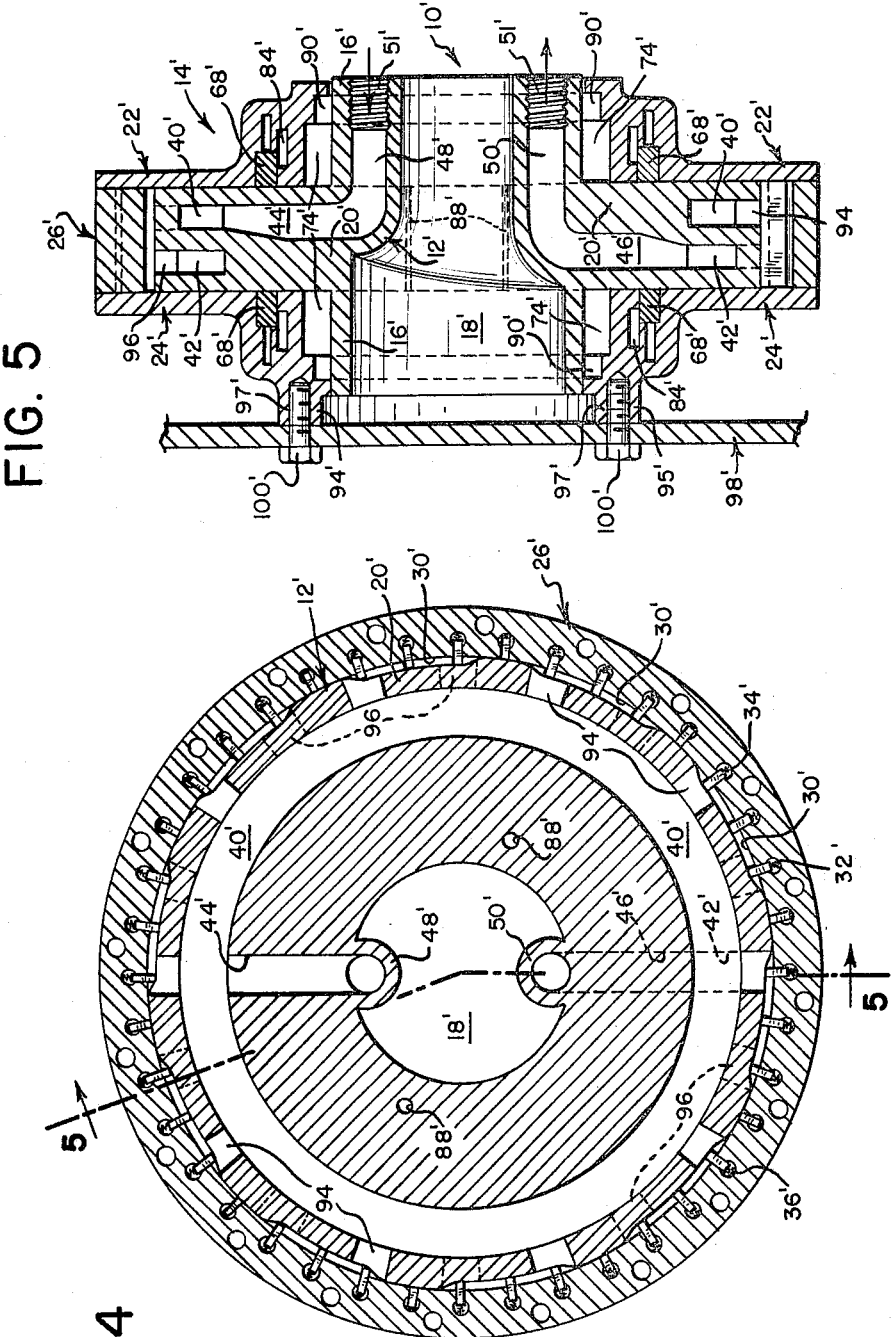
FIGURE 4 is a cross-sectional view of a modification of a fluid motor constructed in accordance with the present invention.
FIGURE 5 is a cross-sectional view taken along the line 5—5 of FIGURE 4.

With reference now to FIGURES 4 and 5, wherein like reference characters indicate like parts, but wherein the reference characters are primed, there is illustated therein a modification of a fluid motor constructed in accordance with the principles of the present invention. At this point, it will be understood that the fluid motor $10^1$ shown in FIGURES 4 and 5 is illustrated partially schematically to facilitate an understanding thereof, and since numerous of the component parts thereof have already been described with particularity in connection with the fluid motor 10 of FIGURES 1 to 3.

The fluid motor $10^1$ of FIGURES 4 and 5 is substantially similar in most respects to the motor 10 of FIGURES 1 to 3, with the exception that the relative positions of the chambers $30^1$ and the vanes $34^1$ are reversed. Thus, the periphery of the flange portion $20^1$ of the shaft member $16^1$ is so configured and arranged as to present a plurality of such chambers, and, in the exemplary form shown, there are provided ten such chambers. As hereinbefore pointed out, the number or quantity of such chambers, and, of course, the number or quantity of cooperating vane members $34^1$ may be varied. In addition, the ring $26^1$ comprises a plurality of grooves $32^1$, in each of which there is positioned a radially reciprocal vane $34^1$. As shown, the vanes $34^1$ are particularly adapted to be urged radially inwardly towards the periphery of the flange portion $20^1$, which now comprises a peripheral camming portion, in any suitable manner, as by means of a biasing element, such as a coil spring $36^1$. Such a biasing element may be arranged relative to the vanes $34^1$ as is the spring 36 of the fluid motor 10, relative to the vane 34. It will now be seen that the vanes $34^1$ are particularly adapted to radially reciprocally move inwardly towards and be maintained in a camming mutual cooperative engageable relationship with the peripheral camming surface of the flange portion $20^1$, enabling the fluid motor $10^1$ to be operable in generally the same manner as the motor 10, the difference being that, in the latter, the camming surface on the ring 26 is rotatably movable, and the vanes 34 are stationary, while, in the former, the converse is true, namely, the vanes 34' are rotatably movable, and the camming surface on the flange portion 20' is stationary.

Inasmuch as the chambers 30' are now positioned upon the peripheral surface of the flange portion 20', communication of fluid pressure may now be directly thereto. Accordingly, the annular grooves 40' and 42' are now positioned in generally vertical alignment with the radial bores 44' and 46', respectively, and, in addition, the flange portion 20' comprises a plurality of passages 94 providing communication between the grooves 40' and one end of each of the chambers 30', and a similar plurality of passages 96 providing communication between the groove 42' and the opposite end of each of the chambers.

In all other respects, the fluid motor 10' is substantially similar to the fluid motor 10 of FIGURES 1 to 3, and, as hereinbefore pointed out, operates in generally the same manner.

It will now be understood that the fluid motor 10 and the motor 10' are each of them so constructed and arranged as to present integral fluid conduits to supply fluid pressure thereto and exhaust fluid therefrom. In the motor 10 there are provided the conduits 48 and 50 for this purpose, and, in the motor 10', the conduits 48' and 50'. In addition, in each motor, there is provided a means for conveying fluid pressure to one end of each of the chambers, and a means for draining fluid from another end thereof. In the motor 10, the means for conveying fluid pressure comprises a passage arrangement defined by the radial bore 44 and the annular groove 40, and a system of passages defined by the channels 52. The means for draining fluid comprises another passage arrangement defined by the radial bore 46 and the annular groove 42, and a system of passages defined by the channels 60. The converse applies, of course, if fluid pressure is supplied through the conduit 50. In the motor 10', there is provided the same means for conveying fluid pressure, and a means for draining fluid, each comprising a similar passage arrangement. The system of passages, however, in the motor 10' is defined by the passages 94 and 96, respectively.

It has hereinbefore been pointed out that the present invention relates to a fluid motor that is so constructed and arranged as to form a component part of a driving wheel that is particularly adapted to have any one of a number of diverse types of wheel elements structurally operatively associated therewith, such as a pneumatic tire, a driving sprocket, an endless track, a rim particularly adapted for use upon a rail, and the like, and even a combination thereof.

With continued reference now to FIGURES 1 to 5, there is illustrated therein an exemplary arrangement enabling the fluid motors 10 and 10' to be structurally operatively associated with any one of the aforesaid wheel elements, and others as well. To that end, and with reference first to the fluid motor 10 of FIGURES 1 to 3, the plate 24 is provided with a plurality of axially outwardly extending bosses 95 having interiorly threaded bores 97. A wheel element plate 98 may now be fixedly structurally operatively associated with the housing plate 24 of the housing 14 in any suitable manner, as by means of conventional fasteners 100. In a similar manner, a wheel element plate 98' may be fixedly structurally operatively associated with the housing plate 24' of the housing 14' of the fluid motor 10' of FIGURES 4 and 5.

With particular reference now to FIGURE 6, illustrated therein is an exemplary construction enabling the wheel element plate of the fluid motor 10 to take the form of the rim of a driving wheel comprising a pneumatic tire, and the manner in which the fluid motor is structurally operatively associated therewith. At this point, it will be understood that the ensuing description is equally applicable to the fluid motor 10' of FIGURES 4 and 5, and the wheel element plate 98' thereof.

The wheel element plate 98 is particularly adapted to define the rim of a driving wheel, as hereinbefore pointed out, and comprises an annular channel 102 which in turn, defines an annular base portion 104 and a plurality of annular mounting lips 106. A pneumatic tire 108, which may be of any suitable and conventional construction, is particularly adapted to be structurally operatively associated with and upon the rim 98, and within the channel 102, in any suitable manner. It may now be said that the fluid motor 10, for example, comprises a component part of a driving wheel 110, which driving wheel comprises the fluid motor and the pneumatic tire 108. In addition, a driving wheel may comprise a braking assembly comprising, in turn, an annular brake lining 112, fabricated of any suitable material, and fixedly positioned upon and interiorly of the rim 98 and the base portion 104 of the channel 102 in any suitable manner. The braking assembly comprises, further, an annular internal brake shoe 114 that is particularly adapted to be moved into and out of a braking mutual cooperative engageable relationship with the lining 112. To this end, a brake shoe mounting plate 116 is fixedly structurally operatively associated with and upon the shaft member 12 of the fluid motor 10, in any suitable manner, as by conventional fasteners, such as the fasteners 100, which are particularly adapted to threadably cooperate with the base portion 16. Of course, the radial dimensional extent or thickness of the base portion 16 should be suitably increased to enable the fasteners to cooperate therewith. A king pin arrangement 118 for a steering mounting (not shown) which may be of any suitable and conventional construction, is positioned upon the mounting plate 116. In addition, a plurality of brake cylinders 122 are positioned between the plate 116 and the shoe 114. These cylinders are particularly adapted to be actuated by braking fluid supplied thereto and exhausted by means of fluid conduits 120, enabling the shoe to be moved into and out of the aforesaid braking relationship with the lining 112.

It is again emphasized that, as hereinbefore pointed out, while the fluid motor 10 of FIGURES 1 to 3, comprising the wheel element plate 98, has been illustrated in FIGURE 6 as comprising a component part of the driving wheel 110, the fluid motor 10', comprising the wheel element plate 98' of FIGURES 4 and 5 is equally applicable thereto. In either case, the operation is considered readily apparent in view of the hereinbefore set forth description.

With particular reference to FIGURE 7, another embodiment of a driving wheel 124, comprising the fluid motor 10, is illustrated therein, though, as is considered readily apparent, this driving wheel may comprise the fluid motor 10'. The wheel element plate 98 of the driving wheel 124 comprises a driving sprocket 126 having sprocket teeth 128 located about the periphery thereof, in the conventional manner.

Figure 8:
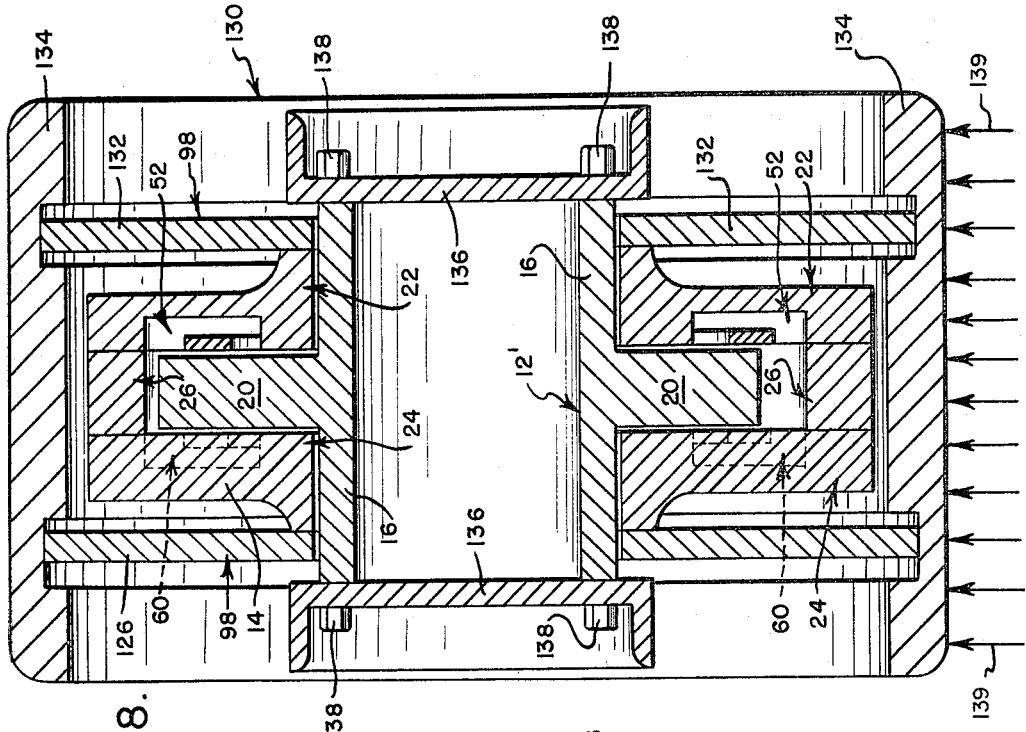
FIGURE 8 is a cross-sectional view of a still further embodiment of a driving wheel, comprising a plurality of diverse types of wheel elements, and having a fluid motor constructed in accordance with the principles of the present invention in structural operative association therewith.

With particular reference now to FIGURE 8, another embodiment of a driving wheel 130, comprising the fluid motor 10, is illustrated therein. Again, while the fluid motor 10 illustrated in FIGURES 1 to 3 is shown in FIGURE 8 as comprising a component part of the driving wheel 130, it will be understood that the fluid motor 10' of FIGURES 4 and 5 is equally applicable thereto. It will further be understood that, in FIGURE 8, certain component parts are illustrated schematically, to facilitate an understanding thereof.

More particularly, the driving wheel 130 illustrates an exemplary application of the sprocket wheel 126 of the driving wheel 124 of FIGURE 7. Accordingly, a wheel element plate 98 that is so constructed and arranged as to define a driving sprocket 126 is fixedly structurally operatively associated with and upon the housing plate 24. In addition, a similar wheel element plate 98 is fixedly structurally operatively associated with and upon the housing plate 22, so as to define another driving sprocket 132. Each of the driving sprockets 126 and 132 is particularly adapted to have sprocket teeth (not shown) located completely about the periphery thereof, which sprocket teeth are particularly adapted to be mutually cooperatively engageable with an endless pad or track 134, defining a wheel element, of a vehicle (also not shown) to be driven thereby.

The shaft portion 12 is particularly adapted to be fixedly structurally operatively associated with the aforesaid vehicle, and, to this end, there is fixedly structurally operatively associated with and upon the base portion 16 thereof a plurality or pair of vehicle channels 136, it being understood that these channels comprise a component part of the aforesaid vehicle. The channels 136 may be associated in the manner aforesaid with the base portion 16 in any suitable manner, as by means of fasteners 138 of any suitable construction.

It will be understood that, as the vehicle travels along the terrain, the weight thereof causes the terrain to introduce reaction forces 139. It will now be understood that the driving wheel 130 is so constructed and arranged as to transmit these forces or stresses tending to be introduced by the weight of the vehicle substantially directly thereto, enabling the elimination of the introduction of direct stresses to the fluid motor thereof. Thus, the reaction forces 139 will be transmitted, through the medium of the endless track 134, directly to the driving sprockets 126 and 132. The stresses introduced into the driving sprockets will thence be transmitted through bearings (not shown), such as the bearings 74, to the base portion 16 of the stationary member 12. The stresses transmitted to the base portion will then be transmitted to the vehicle (not shown) through the medium of the vehicle channels 136. Accordingly, the fluid motor will be operable at maximum efficieny.

Figure 9:
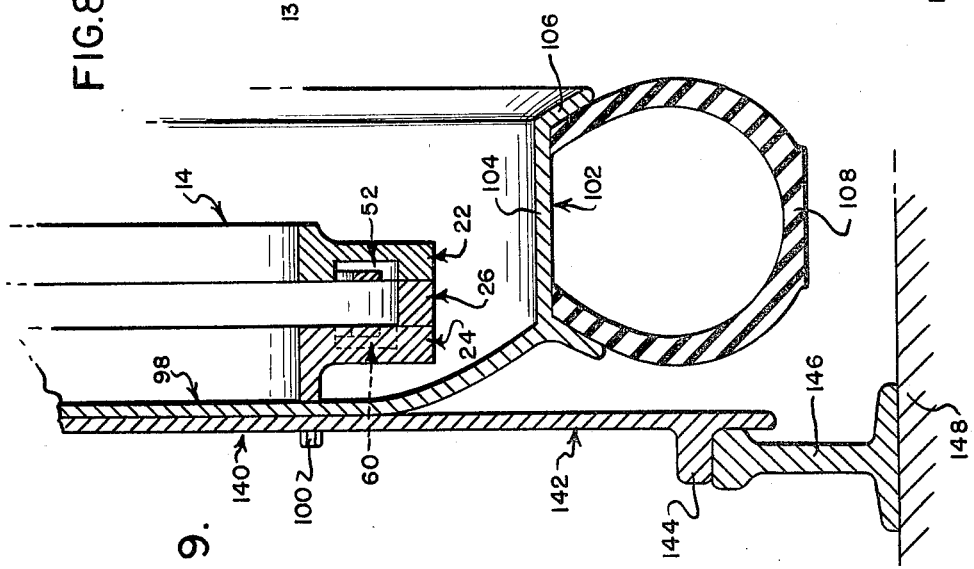
FIGURE 9 is a cross-sectional view of yet another type of driving wheel.

With particular reference now to FIGURE 9, there is illustrated therein a driving wheel 140 which may comprise either one of the fluid motors 10 or 10', with the former being schematically illustrated therein for exemplary purposes, and a combination of wheel elements, presenting a construction that is operable on diverse types of terrain. Thus, the driving wheel 140 comprises the wheel element plate 98 and a wheel element plate 142. The wheel element plate 98 is particularly adapted to take the form of the rim of a wheel, similar to that of the driving wheel 110, with which a pneumatic tire 108 is particularly adapted to be structurally operatively associated. Though not shown, the remaining component parts of the driving wheel such as the braking assembly, may also form component parts of the driving wheel 140.

The wheel element plate 142 is particularly adapted to be so constructed and arranged as to present a rim 144, enabling the driving wheel 140 to be operable upon a rail 146 located upon a rail bed 148. The two plates 98 and 142 may be disposed in superimposed relationship with respect to one another, and fixedly structurally operatively associated with the housing member 14 of the fluid motor by the fasteners 100. It will be understood that the radial dimensional extent of the plate 142 to the rim 144 thereof is less than the same dimension to the pneumatic tire 108, enabling the driving wheel 140 to be utilized on ordinary terrain in the same manner as the driving wheel 110. Of course, the plate 142 can be assembled and disassembled with facility when desired.

It will now be understood that a fluid motor constructed in accordance with the present invention, such as either one of the fluid motors 10 of FIGURES 1 to 3 or 10' of FIGURES 4 and 5 is so constructed and arranged as to form a component part of a driving wheel, which driving wheel is particularly adapted to have structurally operatively associated therewith any one of a number of diverse types of wheel elements, either singly, and even in combination, the fluid motor further being so constructed and arranged as to enable the driving wheel to be structurally operatively associated with or mounted upon a vehicle, in any suitable manner, and with extreme and unusual facility, as by means of conventional fasteners, such as cap screws, bolts, and the like. Additionally, the driving wheel itself is structually operatively associated with the fluid motor in an extremely simple manner, thus facilitating the assembly and disassembly thereof with respect thereto.

Certain directional terminology, such as "inwardly," "outwardly," "adjacent," and the like has been used in the foregoing description to facilitate an understanding of the present invention. This relative terminology is intended in its normal and accepted sense, and, therefore, is to be given the broadest possible interpretation, and construction, particularly if and when used in the ensuing claims. It is, however, not in any way to be considered limiting.

As hereinbefore pointed out, the plate 24 is illustrated in the drawings in such a manner as to facilitate an understanding of the present invention. This has been particularly pointed out with respect to FIGURE 1. Thus, notwithstanding the manner in which the channels 60 are illustrated in that figure, these channels are of substantially the same configuration as the channels 52 in the plate 22. The plates 22 and 24 are, however, substantially of the same configuration. The only difference is that the plate 24 is provided with bosses 95, enabling a wheel element plate 98 to be fixedly mounted thereupon. However, the driving wheel 130 of FIGURE 8 comprises a plurality of wheel element plates 98, one of which is particularly adapted to be fixedly positioned upon each of the plates 22 and 24. In this embodiment, therefore, the plates 22 and 24 are identical with one another, and, therefore, are interchangeable with respect to one another. Though, in the remaining embodiments, only the plate 24 is disclosed and described as comprising the bosses 95, it will be understood that, even in the remaining embodiments, the plates 22 and 24 can be fabricated of identical configuration. Thus, in all of the embodiments, the plates 22 and 24, were they identically fabricated, would be interchangeable with one another. In addition, the identically fabricated plates 22 and 24 would be readily associatable with a driving wheel 130, comprising a plurality of driving sprockets 126 and 132.

While the invention has been shown, illustrated, described and disclosed in terms of embodiments or modifications which it has assumed in practice, the scope of the invention should not be deemed limited by the precise embodiments or modifications herein shown, illustrated, described or disclosed, such other embodiments or modifications intended to be reserved especially as they fall within the scope of the claims here appended.

What is claimed is:
1. A fluid motor particularly adapted for use as a component part of a driving wheel comprising:

a stationary shaft member having:
a base portion, said base portion comprising:
a plurality of conduits integral therewith;
a flange portion, said flange portion comprising:
a plurality of passage arrangements providing communication from said fluid conduits having:
a plurality of radially extending bores; and
a plurality of completely annular grooves;
one of said bores communicating, at one end thereof, with an end of one of said conduits, and with one of said grooves at the other end thereof;
another of said bores communicating, at one end thereof, with one end of another of said conduits, and with another of said grooves at the other end thereof;
a housing member enclosing the flange portion of said shaft member, and comprising:
a first annular housing plate rotatably mounted on the base portion of said shaft member adjacent one surface of said flange portion;
a second annular housing plate rotatably mounted on said base portion adjacent another surface of said flange portion;
each of said annular plates extending radially outwardly of said base portion a distance greater than said flange portion; and
a ring disposed radially outwardly of said flange portion and between said plates, and being connected thereto, so as to be rotatable therewith;
one of said flange portion and said ring having a plurality of equi-spaced chambers positioned thereabout;
another of said flange portion and said ring having a plurality of equi-spaced radially extending grooves positioned thereabout;
a vane member radially reciprocally disposed in each of said grooves;
a spring positioned in each of said grooves for resiliently urging said vane members into mutual cooperative engagement with that one of said flange portion and said ring having said chambers;
said first and second plates each of them comprising:
an annular bearing housing located adjacent to the base portion of said shaft member;
roller bearings positioned within said bearing housings;
an annular bearing seal ring located axially outwardly of said bearing housings to preclude leakage of fluid outwardly of said annular plates and along said base portions;
an annular flange portion sealing ring located radially outwardly of each of said bearings, and in sealing engagement with said one and said other surface of said flange portions;
a spring urging each of said annular flange portion sealing rings into sealing engagement with the faces of said flange portion;
a gap extending between each of said flange portion sealing rings and said bearings, enabling fluid that enters said gap to be communicated to said bearings, further enabling the lubrication thereof;
a one-way sealing ring located radially inwardly of and adjacent to each of said flange portion rings to preclude leakage therealong in one direction, further enabling fluid pressure to be directed to said gap past said flange portion sealing ring, and to enable leakage therealong in another direction, still further enabling said fluid motor to be internally case drained to that one of said conduits connected to an exhaust;
internal fluid passages extending between the bearing housing in each of said annular plates, enabling the fluid that lubricates on the high pressure side of the flange portion of said shaft member to be communicated to the low pressure side thereof, further enabling lubrication of the bearing on the latter side of said flange portion;

one system of passages for conveying fluid under pressure from one of said plurality of passage arrangements to one end of each of said chambers; and another system of passages for draining fluid from another end of each of said chambers to another of said passage arrangements.

2. A fluid motor as defined in claim 1, wherein:

said chambers are located in said ring, enabling said ring to define a camming portion; and said grooves are positioned in said flange portion; enabling said vanes to radially reciprocally extend outwardly of said flange portion into engagement with said camming portion.

3. A fluid motor as defined in claim 2, wherein:

said annular grooves are located in each face of said flange portion;

said system of passages for conveying fluid under pressure comprises:

a plurality of channels of U-shaped configuration;

said channels being positioned in one of said first and second annular plates, and extending from one of said annular grooves to said one end of each of said chambers to provide communication therebetween;

said system of passages for draining fluid comprises:

a plurality of channels of U-shaped configuration;

said channels for draining fluid being positioned in the other of said first and second annular plates, and extending from the other end of said chambers to the other of said annular grooves.

4. A fluid motor as defined in claim 1, wherein:

said chambers are located in said flange portion, enabling said flange portion to define a camming portion; and said grooves are positioned in said ring;

enabling said vanes to radially reciprocally move outwardly of said ring and into engagement with said camming portion.

5. A fluid motor as defined in claim 3, wherein:

said annular grooves are located within said flange portion;

said system of passages for conveying fluid under pressure comprises:

a plurality of radially extending passages positioned in the flange portion of said shaft member;

said passages extending from one of said annular grooves to said one end of each of the chambers; and said system of passages for draining fluid comprises:

a plurality of radially extending passages positioned in said flange portion;

said passages for draining fluid extending from the other end of each of said chambers to the other of said annular grooves.

6. A fluid motor particularly adapted for use as a component part of a driving wheel, comprising:

a shaft member having:

a plurality of fluid conduits; and one passage arrangement for providing communication from one of said fluid conduits; and another passage arrangement for providing communication with another of said fluid conduits;

said plurality of passage arrangements comprising:

a plurality of radially extending bores; and a plurality of completely annular grooves;

said annular grooves being located in each of a plurality of faces of said shaft member, a housing member enclosing said shaft member, and comprising:

a plurality of housing plates mounted on said shaft member for rotatable movement thereabout; and a ring positioned between said plates, and being connected thereto for rotation therewith;

one of said shaft members and said ring having a plurality of chambers;

another of said shaft member and said ring having a plurality of vanes;

said chambers being located in said ring for enabling said ring to define a camming portion; and said vanes being positioned in said shaft member for enabling said vanes to radially reciprocally extend outwardly of said shaft member into engagement with said camming portion;

said housing plates each of them comprising:

bearings located therein adjacent said shaft member, enabling said housing member to rotate with respect thereto;

a sealing arrangement for substantially precluding leakage from each of said passage arrangements and between said housing plates and said shaft member;

said sealing arrangement enabling a portion of a fluid in one of said passage arrangements to flow therepast towards said bearings for the lubrication thereof;

one system of passages for conveying fluid under pressure from one of said fluid conduits to one end of each of said chambers through one of said passage arrangements;

said system of passages for conveying fluid under pressure comprising:

a plurality of channels positioned in said housing member, and extending from one of said annular grooves to said one end of each of said chambers to provide communication therebetween; and another system of passages for draining fluid from another end of said chambers through another of said passage arrangements to another of said fluid conduits;

said system of passages for draining fluid comprising:

a plurality of channels;

said channels for draining fluid being positioned in said housing member, and extending from the other end of said chamber to the other of said annular grooves.

7. A fluid motor as defined in claim 6, wherein:

each of said sealing arrangements comprise:

a sealing ring positioned in each of said housing plates and being located radially outwardly of each of said bearings;

a biasing element urging each of said sealing rings into sealing engagement with said shaft member;

a gap extending between each of said sealing rings and said bearings, enabling fluid that leaks past said sealing rings to be communicated to said bearings for the lubrication thereof; and a one-way sealing ring located radially inwardly of and adjacent to each of said flange portion rings to preclude leakage therealong in one direction, further enabling fluid pressure to be directed to said gap past said flange portion sealing ring, and to enable leakage therealong in another direction, still further enabling said fluid motor to be internally case drained to that one of said conduits connected to an exhaust.

8. A fluid motor as defined in claim 7, wherein there is provided:

a bearing housing positioned in each of said housing plates;

said bearings being disposed in said bearing housings; and internal fluid passages extending between the bearing housings in each of said housing plates, enabling the fluid that lubricates on a high pressure side of said shaft member to be communicated to a low pressure side thereof, further enabling lubrication of the bearing on the latter side of said shaft member.

9. A fluid motor particularly adapted for use with a driving wheel comprising:

a plurality of relatively rotatably movable members;

one of said members having:

a plurality of chambers; and another of said members having:

a plurality of vanes;

said vanes being movable into engagement with that one of said members having said chambers;

a plurality of fluid conduits integral with one of said relatively rotatably movable members for supplying fluid pressure thereto and exhausting fluid therefrom;

means for conveying fluid under pressure to one end of each of said chambers;

said means for conveying fluid under pressure comprising:

a passage arrangement; and a passage system;

means for draining fluid from another end of each of said chambers;

said means for draining fluid comprising:

a passage arrangement; and a passage system;

bearings positioned between said members enabling relative rotatable movement therebetween; and sealing arrangements for substantially precluding leakage from each of said means and between said members;

said sealing arrangements comprising:

a seal ring located radially outwardly of each of said bearings, and between said relatively rotatably movable members;

a biasing element urging said seal ring into sealing mutual cooperative engagement with one of said movable members; and a one-way sealing ring located radially inwardly of and adjacent to each of the aforesaid sealing rings to preclude leakage therealong in one direction, further enabling fluid pressure to be directed to said gap past said flange portion sealing ring, and to enable leakage therealong in another direction, still further enabling said fluid motor to be internally case drained to that one of said conduits connected to an exhaust;

said sealing arrangements enabling a certain portion of said pressure fluid to flow therepast towards said bearings for the lubrication thereof.

10. A fluid motor as defined in claim 9, wherein:

said one member is a shaft and said another member is a ring;

said chambers being located in said shaft member for enabling said shaft member to define a camming portion;

said vanes being positioned in said ring for enabling said vanes to radially reciprocally move outwardly of said ring into engagement with said camming portion.

11. A fluid motor as defined in claim 10, wherein:

said plurality of passage arrangements comprises:

a plurality of radially extending bores; and a plurality of completely annular grooves;

said annular grooves being located within said flange portion; and wherein:

said system of passages for conveying fluid under pressure comprises:

a plurality of radially extending passages positioned in said shaft member;

said passages extending from one of said annular grooves to the one end of each of said chambers; and said system of passages for draining fluid comprises;

a plurality of radially extending passages positioned in said shaft member;

said passages for draining fluid extending from the other end of each of said chambers to the other of said annular grooves.

12. A fluid motor as defined in claim 11, wherein:

each of said sealing arrangements comprises:

a sealing ring positioned in each of said housing plates, and being located radially outwardly of each of said bearings;

a biasing element urging each of said sealing rings into sealing engagement with said shaft member;

a gap extending between each of said sealing rings and said bearings, enabling fluid that leaks past said sealing rings to be communicated to said bearings for the lubrication thereof; and a one-way sealing ring located radially inwardly of and adjacent to each of said flange portion rings to preclude leakage therealong in one direction, further enabling fluid pressure to be directed to said gap past said flange portion sealing ring, and to enable leakage therealong in another direction, still further enabling said fluid motor to be internally case drained to that one of said conduits connected to an exhaust.

13. A fluid motor as defined in claim 12, wherein there is provided:

bearing housings positioned in each of said housing plates;

said bearings being disposed in said bearing housings; and internal fluid passages extending between the bearing housings in each of said housing plates enabling the fluid that lubricates on a high pressure side of the shaft member to be communicated to a low pressure side thereof, further enabling lubrication of the bearing on the latter side of said shaft portion.

14. A fluid motor as defined in claim 9 wherein:

one of said relatively movable members is so constructed, configured and arranged as to define:

a gap between said members, enabling fluid that leaks past said sealing rings to be communicated to said bearings, enabling the lubrication thereof.

15. A fluid motor as defined in claim 14, wherein there is provided:

internal fluid passages extending between said bearings, enabling fluid that lubricates the bearing on a high pressure side of said motor to be communicated to a low pressure side thereof, further enabling lubrication of the bearing on the low pressure side.

16. A fluid motor as defined in claim 15, wherein:

one of said movable members further comprises:

a wheel element plate structurally operatively associated therewith;

enabling any one of a plurality of diverse types of wheel elements to be structurally operatively associated with said fluid motor, and further enabling said fluid motor to be particularly adapted for use with a driving wheel capable of functioning over diverse types of terrain.

17. A fluid motor as defined in claim 16, wherein:

said wheel element plate defines:

a wheel rim having:

an annular channel structurally operatively associated therewith; and said driving wheel further comprises:

a wheel element structurally operatively associated with said wheel rim and within the channel thereof.

18. A fluid motor as defined in claim 17, wherein:

said wheel element comprises:

a pneumatic tire.

19. A fluid motor as defined in claim 18, wherein:

another wheel element plate is positioned in fixed superimposed relationship with respect to said wheel rim;

said other plate being so constructed and arranged as to define:

a rim particularly adapted for use upon a rail;

enabling said fluid motor to be particularly adapted for use with a driving wheel capable of functioning alternatively over diverse types of terrain.

20. A fluid motor as defined in claim 16, wherein:

said wheel element plate defines:

a sprocket.

21. A fluid motor as defined in claim 16, wherein there is provided:

a plurality of wheel element plates;

each of said plates being fixedly structurally operatively associated with one of said relatively rotatably movable members, and defining:

a driving sprocket;

a wheel element positioned upon and about said driving sprockets, and being particularly adapted to be driven thereby; and a plurality of structural members fixedly structurally operatively associated with another of said movable members, enabling said driving wheel to be structurally operatively associated with and upon a vehicle, and further enabling any reaction stresses induced by the weight of said vehicle to be substantially directly transmitted generally only thereto.

22. The fluid motor as set forth in claim 15 together with a wheel element plate fixedly structurally operatively associated with one of said rotatably movable members:

said wheel element plate defines:

a wheel rim having:

an annular channel structurally operatively associated therewith; and said driving wheel further comprises:

a wheel element structurally operatively associated with said wheel rim and within the channel thereof.

23. A driving wheel as defined in claim 22, wherein:

said wheel element comprises:

a pneumatic tire.

24. A driving wheel as defined in claim 23, wherein:

another wheel element plate is positioned in fixed superimposed relationship with respect to said wheel rim;

said other plate being so constructed and arranged as to define:

a rim particularly adapted for use upon a rail;

enabling said fluid motor to be particularly adapted for use with a driving wheel capable of functioning alternatively over diverse types of terrain.

25. A driving wheel comprising:

a fluid motor;

said fluid motor comprising:

a plurality of relatively rotatably movable members;

bearings positioned between said members enabling the relative movement therebetween;

sealing arrangements for substantially precluding leakage between said members;

said sealing arrangements enabling a portion of a fluid flowing through said motor to flow therepast towards the bearings for the lubrication thereof;

fluid conduits integral with one of said relatively rotatable movable members for supplying fluid pressure thereto and exhausting fluid therefrom; and a plurality of wheel element plates fixedly structurally operatively associated with one of said members;

each of said plates being fixedly structurally operatively associated with one of said relatively rotatably movable members, and defining:

a driving sprocket;

a wheel element positioned upon and about said driving sprockets, and being particularly adapted to be driven thereby; and a plurality of structural members fixedly structurally operatively associated with another of said movable members, enabling said driving wheel to be structurally operatively associated with and upon a vehicle, and further enabling any reaction stresses induced by the weight of said vehicle to be substantially directly transmitted generally only thereto.

26. A driving wheel as defined in claim 25, wherein:

said one relatively rotatably movable member comprises:

a plurality of interchangeable annular plates.

References Cited by the Examiner

UNITED STATES PATENTS

| | | | |
|---|---|---|---|
| 868,851 | 10/1907 | Erixon | 180—9.64 |
| 1,026,662 | 5/1912 | Eisner | 180—66 X |
| 2,135,307 | 11/1938 | Keator | 295—8.5 |
| 2,418,123 | 4/1947 | Joy | 180—66 |
| 3,008,424 | 11/1961 | Roth | 180—66 X |
| 3,067,831 | 12/1962 | Willock | 180—66 |
| 3,156,191 | 11/1964 | Lauck | 103—126 |
| 3,170,531 | 2/1965 | Katzenberger | 180—6.48 X |

BENJAMIN HERSH, *Primary Examiner.*

MILTON L. SMITH, *Examiner.*